(12) United States Patent
Wretland et al.

(10) Patent No.: US 8,992,139 B2
(45) Date of Patent: Mar. 31, 2015

(54) HOLDER FOR A CUTTING TOOL, A CUTTING TOOL AND A CUTTING INSERT

(75) Inventors: Anders Wretland, Västra Frölunda (SE); Tore Hagward, Trollhättan (SE)

(73) Assignee: GKN Aerospace Sweden AB, Trollhattan (SE)

(*) Notice: Subject to any disclaimer, the term of this patent is extended or adjusted under 35 U.S.C. 154(b) by 360 days.

(21) Appl. No.: 13/321,860

(22) PCT Filed: May 26, 2009

(86) PCT No.: PCT/SE2009/000270
§ 371 (c)(1),
(2), (4) Date: Nov. 22, 2011

(87) PCT Pub. No.: WO2009/145693
PCT Pub. Date: Dec. 3, 2009

(65) Prior Publication Data
US 2012/0063861 A1 Mar. 15, 2012

(51) Int. Cl.
*B23B 31/117* (2006.01)
*B23B 31/30* (2006.01)
(Continued)

(52) U.S. Cl.
CPC ............. *B23B 31/305* (2013.01); *B23B 27/007* (2013.01); *B23B 27/10* (2013.01);
(Continued)

(58) Field of Classification Search
CPC .............................. B23B 31/117; B23B 31/30
USPC ......... 408/181, 185, 153, 238, 239 R, 239 A; 279/4.03, 4.05, 4.06
See application file for complete search history.

(56) References Cited

U.S. PATENT DOCUMENTS 991,884 A * 5/1911 Osgood .................... 408/226
993,395 A * 5/1911 Newbold .................. 279/103
(Continued)

FOREIGN PATENT DOCUMENTS

DE 743530 C 12/1943
DE 3401200 A1 7/1985
(Continued)

OTHER PUBLICATIONS

International Search Report for corresponding International Application PCT/SE2009/000270.
(Continued)

*Primary Examiner* — Daniel Howell
*Assistant Examiner* — Ryan Rufo
(74) *Attorney, Agent, or Firm* — Bejin Bieneman PLC (57) ABSTRACT

A holder for a cutting tool includes a body having a first channel for receiving a stem portion of the cutting tool. The body has a second channel intersecting with the first channel. The holder further includes a plunger to be inserted in the second channel, the plunger having a third channel the cross section of which at least partly overlaps with the cross section of the first channel when the plunger is inserted into the body so as to enable the stem of the cutting tool to extend into the third channel when the stem is inserted in the first channel. The holder further includes a mechanism for locking the stem against movement relative to the body by means of the plunger. A cutting tool for use in such a holder and a cutting insert are also provided.

12 Claims, 6 Drawing Sheets

(51) Int. Cl.
  *B23B 27/00* (2006.01)
  *B23B 27/10* (2006.01)
  *B23B 27/14* (2006.01)
  *B23B 29/034* (2006.01)

(52) U.S. Cl.
  CPC ........ *B23B 27/145* (2013.01); *B23B 29/03407* (2013.01); *B23B 2200/201* (2013.01); *B23B 2200/208* (2013.01); *B23B 2260/12* (2013.01); *B23B 2231/028* (2013.01); *B23B 2231/24* (2013.01)
  USPC ............... 408/181; 408/239 R; 279/4.03

(56) References Cited

U.S. PATENT DOCUMENTS

| | | | | |
|---|---|---|---|---|
| 2,301,981 | A | * | 11/1942 | Steffens .................. 408/141 |
| 2,363,215 | A | | 11/1944 | Williams |
| 2,393,777 | A | * | 1/1946 | Hughes et al. ................ 279/6 |
| 2,468,874 | A | * | 5/1949 | Hawkins .................. 408/226 |
| 2,826,420 | A | * | 3/1958 | Klingler .................. 279/4.03 |
| 3,023,995 | A | * | 3/1962 | Hopkins ...................... 251/5 |
| 3,044,323 | A | * | 7/1962 | Sweeny .................... 408/151 |
| 4,093,052 | A | * | 6/1978 | Falk ........................ 192/85.12 |
| 4,955,767 | A | | 9/1990 | Kaiser et al. |
| 5,402,696 | A | | 4/1995 | Hecht et al. |
| 5,462,293 | A | * | 10/1995 | Samelius et al. ............ 279/4.03 |
| 5,634,745 | A | | 6/1997 | Wiman et al. |
| 5,660,400 | A | | 8/1997 | Kasmeier et al. |
| 6,568,055 | B1 | | 5/2003 | Tang et al. |
| 7,506,877 | B1 | | 3/2009 | Henderson et al. |
| 2004/0253070 | A1 | | 12/2004 | Sheffler et al. |
| 2006/0013664 | A1 | * | 1/2006 | Kaiser et al. .................. 408/181 |
| 2008/0124180 | A1 | | 5/2008 | Breisch |
| 2008/0191429 | A1 | * | 8/2008 | Tugend et al. .................. 279/30 |
| 2008/0245541 | A1 | | 10/2008 | Grunig |

FOREIGN PATENT DOCUMENTS

| | | |
|---|---|---|
| DE | 9100115 U1 | 3/1991 |
| EP | 0026082 A1 | 4/1981 |
| EP | 0768136 A1 | 4/1997 |
| EP | 0791420 A1 | 8/1997 |
| EP | 1093874 A1 | 4/2001 |
| EP | 1475171 A2 | 11/2004 |
| EP | 1702702 A1 | 9/2006 |
| FR | 2501088 A1 | 9/1982 |
| WO | 9318880 A1 | 9/1993 |
| WO | 0181034 A1 | 11/2001 |
| WO | 2005037472 A1 | 4/2005 |

OTHER PUBLICATIONS

International Preliminary Report on Patentability for corresponding International Application PCT/SE2009/000270.
Machine translation of DE743530.
European Search Report for corresponding European Application 09755131.1.
Partial European Search Report for corresponding divisional European Application 13179765.6.

* cited by examiner

HOLDER FOR A CUTTING TOOL, A CUTTING TOOL AND A CUTTING INSERT

BACKGROUND AND SUMMARY

The invention relates to a holder for a cutting tool. In particular the invention relates to holder for a cutting tool where the holder is adapted to firmly hold the cutting tool to transfer a rotational movement from a driving source in boring or milling machine to a cutting tool secured in the holder. The cutting tool may preferably be designed for chip forming metal cutting.

Precision cutting requires that the position at which a cutting tool is located when held by a holder for the cutting tool is highly reproducible. For this purpose various types of holder for cutting tools are known. Precision hole making is defined by characteristics—among others—such as straightness, roundness and position accuracy, and in addition—for some applications—the properties of the produced surfaces. In particular for high integrity components such as gas turbine rotors and pressurized vessels a high demand is imposed on the tools in order to achieve the desired property on the machined surfaces. The type of tool holder used has an impact of the quality of the worked surfaces.

A common type of tool holder is designed as body having a channel for receiving a stem portion of a cutting tool. The stem portion will be locked by screws that penetrate into the channel in order to engage with the stem portion of the cutting tool. With this type of locking engagement, load is concentrated to one or two locations where the screw or screws engage with the stem. It has shown that this type of engagement does not suppress oscillations for certain frequencies, which frequencies depend on the location of the connection between the screw and the shaft. Another type of locking device is presented in U.S. Pat. No. 6,568,055, where an axially wedge shaped sleeve is pushed by a hydraulic actuator to tighten a boring arbour.

It is desirable to provide a tool holder that facilitates preparation of high quality surfaces and which creates conditions for a cost-efficient production and/or use of the tool holder.

A tool holder according to an aspect of the invention comprises a body having a first channel for receiving a stem of the cutting tool. The body furthermore includes a second channel intersecting with the first channel. A plunger is inserted in the second channel. The plunger has a third channel with a cross section which at least partly overlaps with the cross section of the first channel when the plunger is inserted into the body. The stem of the cutting tool thereby extends into the third channel when the stem is inserted in the first channel. The holder further comprises a mechanism for locking the stem against movement relative to the body by means of the plunger. An aspect of the invention is based on the observation that the quality of the machined surfaces is dependent on the wear of the cutting insert. By virtue of the fact that the holder comprises a plunger with said third channel, which plunger is configured for acting on the stem, an accurate holding of the cutting tool can be achieved. Further, by arranging the plunger moveable in the second channel which intersects with the first channel into which a cutting tool is inserted, lateral compensation of the position of the cutting tool is facilitated. Hence, production of high quality surfaces is facilitated.

According to an embodiment, the plunger comprises said locking mechanism. In this way, the need for including functional features for locking the cutting tool in the body is eliminated. It is therefore easier to make the body sufficiently sturdy to achieve a desired stiffness of the tool holder. Preferably the body may be formed as a monolith only provided with ducts for cooling liquid and means for locking and positioning of the plunger relatively to the body. Hence the tool holder enables production of high quality surfaces by facilitating lateral positioning of the cutting tool, while allowing a compact stiff design of the body. The plunger may thus be moveably arranged in the second channel so as to allow lateral dislocation of the plunger and hence of the cutting tool. Accurate lateral positioning of the cutting insert to compensate for the successive wear of the cutting insert may therefore be achieved in a straightforward manner while maintaining a firm grip of the cutting tool.

According to a further embodiment, said locking mechanism comprises a membrane delimiting a pressure chamber. The holder may comprise a mechanism for pressurizing the pressure chamber in order to lock the stem against movement relative to the body. In this embodiment a holder is provided, which enables suppression of oscillation over a wide range of frequencies.

According to a further embodiment, the membrane forms a part of the third channel and is configured to act directly on the stem. The pressure mechanism is configured to press the membrane directly against the stem. Thus, the membrane is integrated into the plunger, which creates further conditions for a firm locking of the cutting tool.

The contact between the stem and the membrane forming part of the third channel in the plunger ensures a distribution of the load on the stem enabling suppressions of oscillation of the cutting tool.

Optionally, the part of the third channel which is formed by the membrane is cylindrical and especially circular-cylindrical. The use of a cylindrical membrane ensures that the membrane grips the stem with a constant radial load. A hydraulic oil pipe is connected to the pressure chamber for enabling a movement of the membrane thereby enabling locking or release of the stem of the cutting tool. The use of hydraulic locking of the stem has a beneficial effect on the suppression of oscillations of the cutting tool.

Optionally a hydraulic oil pipe connects the pressure chamber with an outwardly facing end wall of the plunger, at which the mechanism for pressurizing the pressure chamber is located.

Optionally the first channel may extend along a first length axis and the second channel may extend along a second length axis. Each of the first and second channels are preferably straight. Optionally the first and second axes are essentially perpendicular to each other. By arranging the first and second axes perpendicular to each other, the risk of that the stem is axially dislocated during the locking process is reduced since a small movement of the plunger in the second channel in this case will not result in a translation of the plunger relatively to the length axis of the first channel. Hence movement of the plunger will not result in axial dislocation of the cutting tool.

Optionally the third channel extends through said plunger so as to enable a stem of a cutting tool to extend through said third channel when the stem is inserted in the first channel. The third channel is preferably straight. By allowing the stem to pass through the third channel a good contact between the stem and the membrane is ascertained.

Optionally the holder includes a mechanism for movement of the plunger along a length axis of said second channel so as to position the stem in a lateral position relatively to the body. Lateral positioning is performed to enable accurate positioning as the cutting insert wears out during use.

Optionally the holder comprises means for angular and/or axial positioning of the cutting tool relative to the body. Preferably, the positioning means comprises an indentation provided at an opening of the first channel, which indentation is arranged to receive a notch provided on said stem of the cutting tool, thereby enabling axial and angular positioning of the cutting tool.

The invention furthermore relates, according to an aspect thereof, to a cutting tool for use in a holder, which cutting tool includes a stem. The cutting tool comprises means for angular and/or axial positioning of the cutting tool relative to a body of the holder. Particularly said positioning means comprises a notch provided on a stem of the cutting tool, thereby enabling axial and angular positioning of the cutting tool in the holder. The notch is to be inserted in a corresponding indentation made at the holder for enabling axial and angular positioning of the tool in the holder.

Optionally the stem portion of the cutting tool includes a cooling liquid flow entrance in a lower region of the stem, a cooling liquid feeding conduit extending from said liquid flow entrance to a head located on the top of said stem, and a cooling liquid ejector outlet nozzle connected to said cooling liquid feeding conduit at said top portion of said stem.

Optionally the cooling liquid ejector outlet nozzle has a smaller cross sectional area than said cooling liquid feeding conduit. By arranging the cooling liquid feeding conduit with a larger cross sectional area than the cooling liquid ejector outlet nozzle it is ensured that the pressure drop in the cutting tool can be reduced.

Optionally the cooling liquid ejector outlet nozzle has a length between 1 mm and 3 mm. By making the cooling liquid ejector outlet nozzle short an output spray from the nozzle will be focussed. Long narrow channels will tend to result in a distributed spray. By making the length of the narrow cooling liquid ejector outlet nozzle short, the spray will thus be focused.

Optionally the cooling liquid feeding conduit is eccentric in relation to a centre axis of said stem. Steep changes in flow direction result in cavitation losses. The eccentric location allows for less steep change in flow direction in the vicinity of the cooling liquid ejector outlet nozzle.

The cutting tool preferably comprises a head located on the top of the stem. Optionally, said head includes a first surface, which extends in a plane in parallel with a longitudinal axis of the cutting tool, wherein a cutting insert is located on the first surface, and a second surface which extends in a plane which is inclined with regard to a plane at right angles to the longitudinal axis and which intersects with a length axis of the cooling liquid ejector outlet nozzle. This arrangement allows that the cooling liquid ejector outlet nozzle, which may have an exit opening in the inclined surface which extends perpendicularly to the direction of the inclined surface, may focus a cooling liquid jet on an edge of a cutting insert. The location of the rim an exit opening in a plane vertical to the length axis of the cooling liquid ejector outlet nozzle reduces spray diffusion in comparison to when the plane is inclined in relation to the length axis of the cooling liquid ejector outlet nozzle.

Optionally the cutting tool includes a cutting insert which before use has a polygonal cross sectional shape, that sides of the polygon meet at rounded corners and that a straight portion is present in the rounded area. Preferably, the polygon has the shape of an equilateral triangle or a square. Optionally the cutting insert is secured to said head such that said straight portion is coaxial with a centre axis of a stem of said cutting tool. By allowing the straight portion to be coaxial with the centre axis a reduction of wear of the cutting insert and of unintended deformation of the worked goods can be obtained. It is believed that in the event no straight portion is present in the rounded area a local concentration of force is obtained at the contact between the goods and the cutting insert such that the contact force will initially be too high with excessive wear and risk for damage of the cutting insert as well as of the worked goods as a consequence.

The invention also relates, according to an aspect thereof, to a cutting insert which before use has the shape of an equilateral triangle or a square, which sides meet at rounded corners and that a straight portion is present in the rounded area. Optionally, the rounded corners have a curvature radius between 0.6 and 1.2 mm and that the straight area has a length between 0.07 and 0.15 mm.

BRIEF DESCRIPTION OF THE DRAWINGS

Embodiments of the invention will now be described in more detail with reference to appended drawings, where.

DETAILED DESCRIPTION

Figure 1:
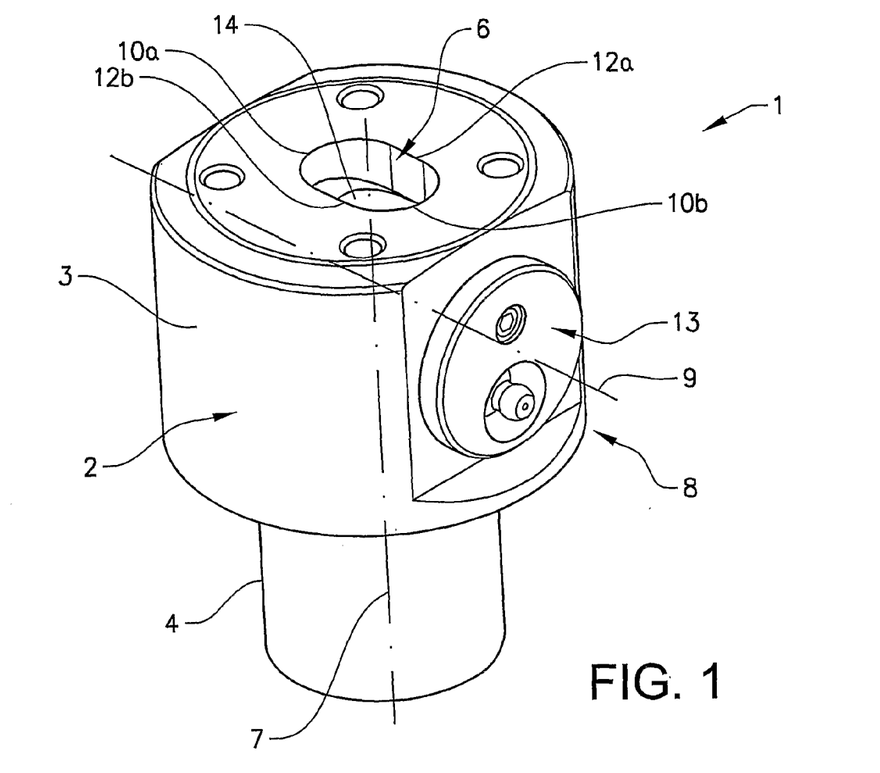
FIG. 1 shows a perspective view of a holder for a cutting tool.

In FIG. 1 a holder 1 for a cutting tool (not shown) is shown. The holder 1 comprises a body 2. The body 2 includes a head portion 3 and a stem portion 4. The head portion 3 includes a first channel 6 arranged for receiving a stem of a cutting tool. The first channel 6 extends along a first length axis 7 in a first axial direction which is coaxial with a rotational axis when the tool holder is mounted in a metal working machine. The head portion 3 furthermore includes a second channel 8, which intersects with said first channel 6. The second channel 8 extends along a second length axis 9. The first and second length axes 7, 9 are preferably perpendicular or essentially perpendicular to each other. The first channel 6 has in the embodiment shown in FIG. 1 a cross-section in a plane transverse to the first length axis 7 which is of a larger dimension than a stem of a cutting tool. More specifically, said cross section is elongated and preferably composed of two half circles 10a, 10b connected with two linear segments 12a, 12b. The stem of the cutting tool having a circular cross-section may thus be moved in direction of the second length axis.

A plunger 13 is inserted in the second channel 8. The plunger 13 is provided with a third channel 14, see FIG. 2, the cross section of which at least partly overlaps with the cross section of the first channel 6 when the plunger 13 is inserted into the body 4. In FIG. 1, part of an upper opening of the third channel 14 is shown below an upper opening of the first channel 6.

Figure 2:
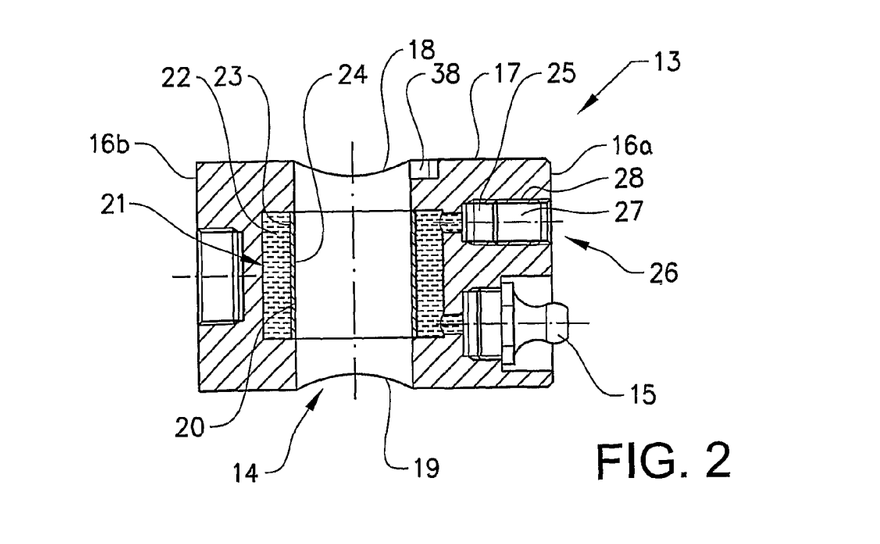
FIG. 2 shows a cross section through a plunger along a plane formed by the length axes of a first and second channel respectively, when the plunger is installed in correct position in the second channel.

The stem of the cutting tool inserted in the first channel 6 may thus be received in the third channel 14.

In FIG. 2 is shown a cross section through the plunger 13 along a plane formed by the length axes 7, 9 of the first and second channel respectively, when the plunger is installed in correct position in the second channel. The plunger 13 has a cylindrical shape with two parallel, flat end surfaces or end walls 16a, 16b connected by an envelope surface 17. The plunger 13 may have alternative shapes as long as it fits and in the second channel 8 and may be secured in the second channel 8 so as to allow a limited axial movement in the second axial direction 9. In the drawing it is shown that the third channel 14 extends through the plunger 13 from an upper opening 18 to a lower opening 19.

A membrane 20 forms a part of the third channel. The membrane 20 may be formed by a cylindrical sleeve which is introduced into an internal cavity in the wall forming the third channel. The sleeve is sealed at its upper and lower ends. The sleeve 20 covers an annular shaped trace 21 in the cavity forming the third channel. The trace 21 forms a pressure chamber 22, which has an annular shape. An interior cylindrical wall 23 of the pressure chamber extending along the first length axis 7 is thus defined by an envelope surface of said membrane 20, which faces radially outwards. Part of the third channel 14 is defined by an envelope surface of said membrane 20, which faces radially inwards. Thus, said envelope surfaces are defined by opposite sides of a wall 24 of said membrane. A hydraulic oil pipe 25 is connected to the pressure chamber 22 for enabling a movement of the membrane 20 thereby enabling locking or release of the stem of the cutting tool. The hydraulic oil pipe 25 connects the pressure chamber 22 with the end surface, or wall 16a of the plunger 13. A mechanism 26 for pressurizing the pressure chamber is located at the end wall. In this embodiment, the mechanism for pressurising the pressure chamber is constituted by a screw 27 arranged in a threaded bore 28. By rotating the screw such that it is moved inwardly, an incompressible hydraulic fluid contained in the pressure chamber and the hydraulic oil pipe would force the membrane to bulge inwardly and grip a stem of a cutting tool, if present in the third channel. By rotating the screw such that it is moved outwardly, the membrane would progressively be released to assume an unloaded position and a grip a stem of a cutting tool, if present in the third channel, may be released. In order to facilitate filling of the pressure chamber with suitable hydraulic oil or grease a vacuum nipple 15 is connected to the pressure chamber via a conduit. Filling of the chamber can then be achieved by connecting the nipple 15 to a vacuum source while removing the screw 27 from the bore 28 and supplying oil or grease to the conduit connected to the bore 28.

Figure 3:
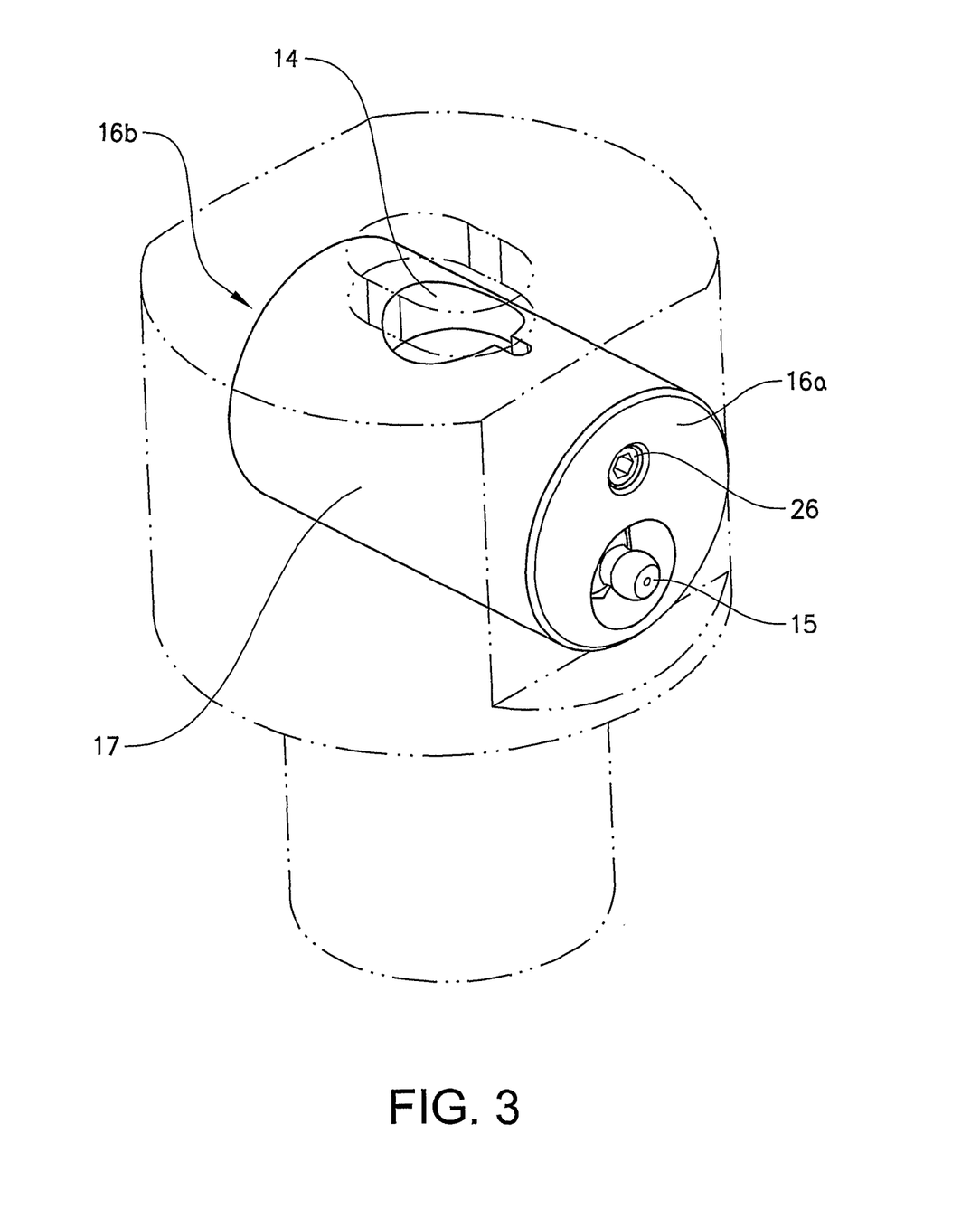
FIG. 3 shows a perspective view of a plunger.

FIG. 3 shows the plunger 13 of FIG. 2 in perspective view positioned in the body 2. The third channel 14 is visible in the envelope surface 17. One of the end walls 16a is provided with the locking means 26 and the nipple 15.

Figure 4:
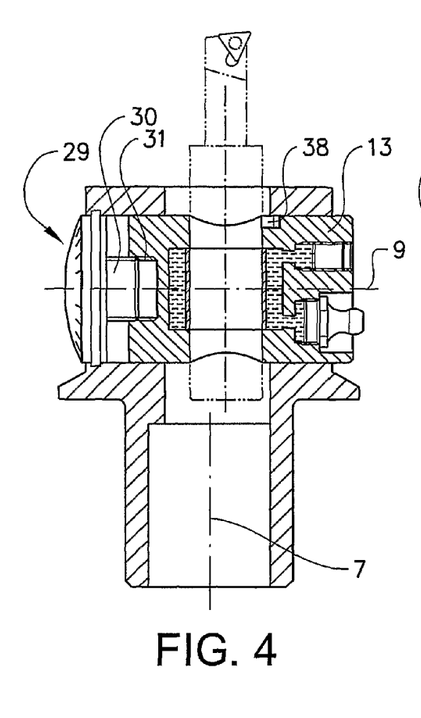
FIG. 4 shows a cross section along a plane formed by the length axes of a first and second channel respectively, with a plunger in a first retracted position.
Figure 5:
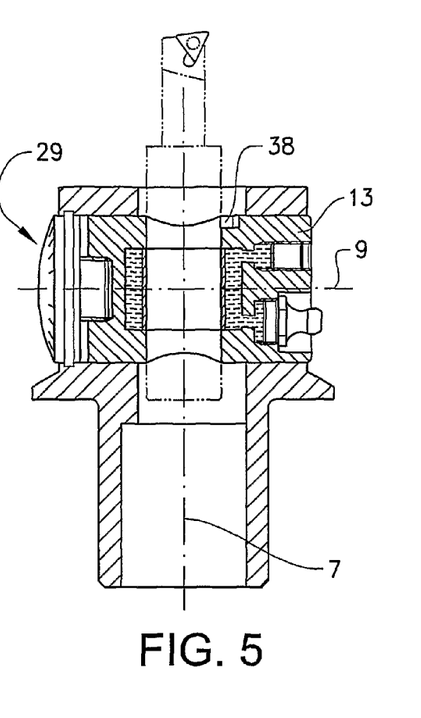
FIG. 5 shows a cross section along a plane formed by the length axes of a first and channel respectively, with a plunger in a second projecting position.

In FIGS. 4 and 5 cross sections along a plane formed by the length axes of the first and second channel 6,8 respectively, with the plunger 13 in a first advanced position (FIG. 4) and in a second retracted position (FIG. 5) in the body 2, are shown.

Figure 6:
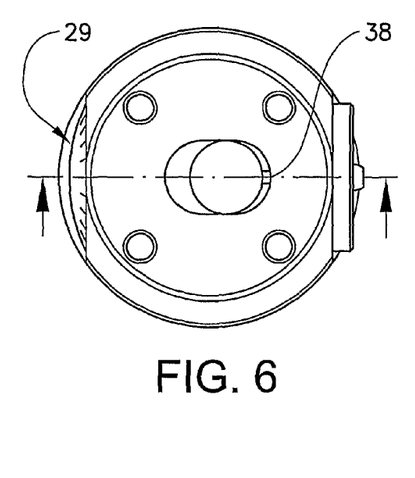
FIG. 6 shows a top view of a holder, with a plunger in a first retracted position.
Figure 7:
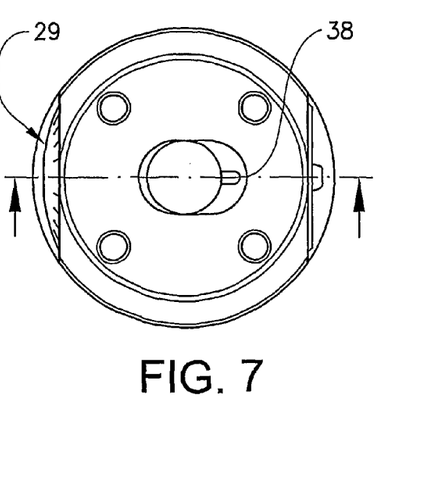
FIG. 7 shows a top view of a holder, with a plunger in a second projecting position.

In FIGS. 6 and 7 top views of the holder, with the plunger in the first advanced position (FIG. 6) and in the second retracted position (FIG. 7), are shown.

The holder shown in FIGS. 4-7 comprises a mechanism 29 for movement of the plunger along the length axis 9 of said second channel so as to position the stem of a cutting tool in a lateral position relatively to the body, that is along the length axis 9 of said second channel. The mechanism 29 includes a threaded screw 30 which engages in a threaded bore 31 formed in the plunger 13 or a nut secured to the plunger 13.

Figure 8:
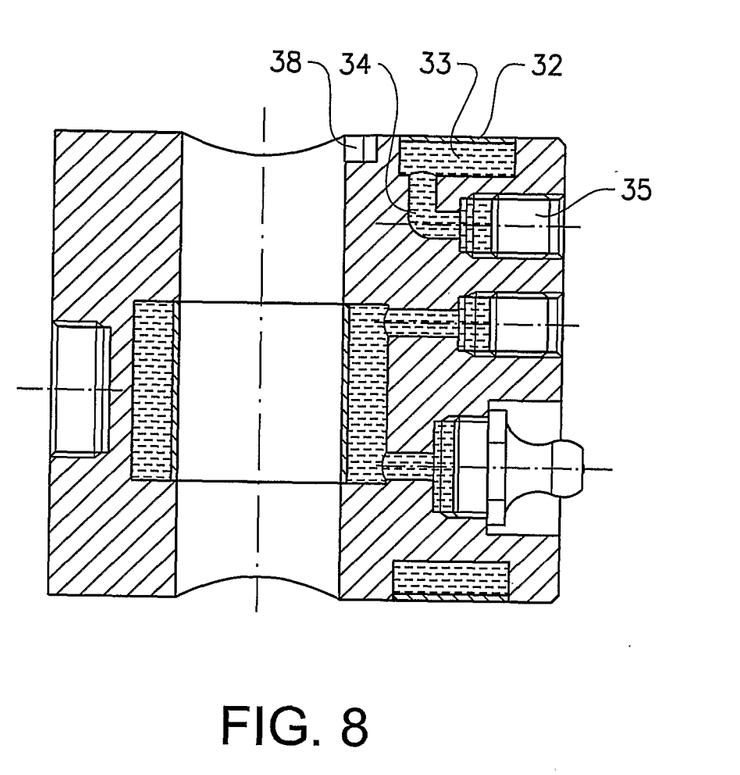
FIG. 8 shows a cross section through a plunger as shown in FIG. 2 further including means for locking the plunger against movement in the length direction of the second channel.

In an embodiment of the invention, as shown in FIG. 8, locking of the plunger against movement along the length axis 9 of said second channel may be achieved by a membrane 32 arranged in the envelope surface 17 of the plunger. A pressure chamber 33 is arranged inside of the membrane. The membrane is cylindrical in shape and the pressure chamber has an annular shape. A hydraulic oil pipe 34 is connected with the pressure chamber 33 and a mechanism 35 is configured for pressurizing the pressure chamber 33 so as to press the membrane 32 against inner walls of the second channel and lock the plunger against movement relative to the body. The mechanism 35 includes a threaded screw 36 which engages in a threaded bore 37.

As is seen in FIGS. 2-8, an indentation 38 is provided in the plunger 13 at an upper opening 18 of the third channel 14. The indentation 38 is arranged to receive a notch provided on said stem of a cutting tool, thereby enabling axial and angular positioning of the cutting tool.

Figure 9:
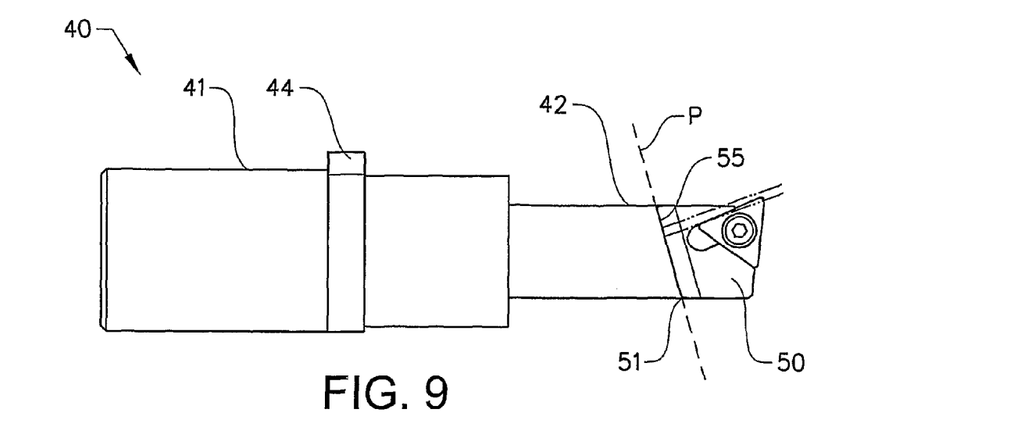
FIG. 9 shows a side view of a cutting tool, facing a flat surface in the head of the cutting tool.
Figure 10:
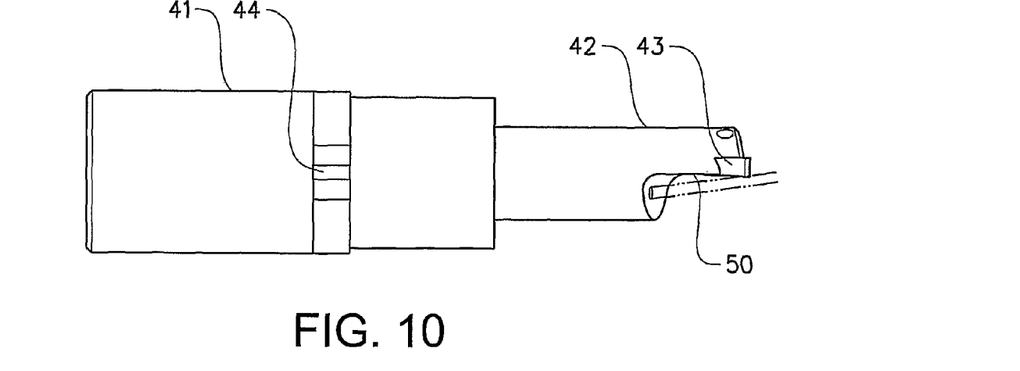
FIG. 10 shows a side view of the cutting tool shown in FIG. 7 taken along a flat surface in the head of the cutting tool.

In FIGS. 9 and 10 a cutting tool 40 is shown. The cutting tool 40 includes a stem 41 arranged to be inserted into the first and third channels of the holder for the cutting tool. The cutting tool furthermore includes a head 42 on which a cutting insert 43 is positioned. A notch 44 is provided on the stem 41 of the cutting tool, thereby enabling axial and angular positioning of the cutting tool in the holder, when the notch is positioned in a corresponding recess in the cutting tool holder. The stem 41 preferably includes or consists of cemented carbide and the head 42 is preferably made of tool steel. This combination ensures that the cutting tool has a high rigidity, while allowing formation of a carrier pocket or a carrier wall for a cutting insert with high accuracy.

Figure 11:
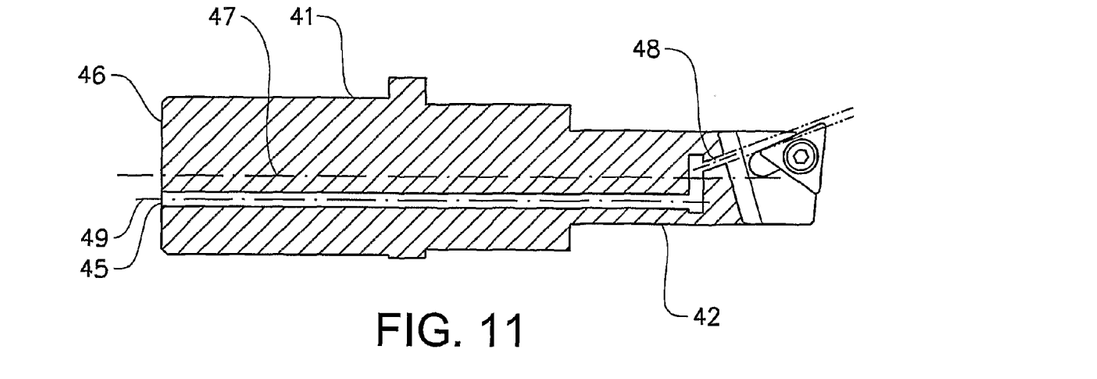
FIG. 11 shows a cross section of the cutting tool in FIGS. 9 and 10, and FIGS. 12 and 13 show a cutting insert in detail.

In FIG. 11 a cross section of the cutting tool in FIGS. 9 and 10 is shown. The cutting tool includes a cooling liquid flow entrance 45 in a lower region 46 of the stem. A cooling liquid feeding conduit 47 extends from said liquid flow entrance 45 to the head 42 located on the top of the stem 41. A cooling liquid ejector outlet nozzle 48 is connected to the cooling liquid feeding conduit 47 at the head 42. The cooling liquid feeding conduit 47 is eccentric in relation to a centre axis 49 of said stem. The cooling liquid ejector outlet nozzle 48 has a smaller cross sectional area than said cooling liquid feeding conduit 47. The cooling liquid ejector outlet nozzle may have a length between 1 mm and 3 mm.

The head 42 includes a first, substantially flat surface in the form of a vertical wall 50 on which the cutting insert 43 is located. The first flat surface 50 extends in a plane in parallel with the length direction of the cutting tool 40. The head furthermore includes a second, substantially flat surface 51, which is arranged at right angles to the first flat surface. The second flat surface 51 is further inclined with regard to a direction at right angles to the length direction of the cutting tool 40. The second surface forms an inclined wall 51 which extends in a plane P intersecting with a length axis 56 of the cooling liquid ejector outlet nozzle. The cooling liquid ejector outlet nozzle has an exit opening 55 in the inclined wall which extend perpendicularly to the direction of the inclined wall. A cooling liquid ejector outlet nozzle (48) opening for the cooling liquid is located in said second, inclined surface 51.

Figure 12:
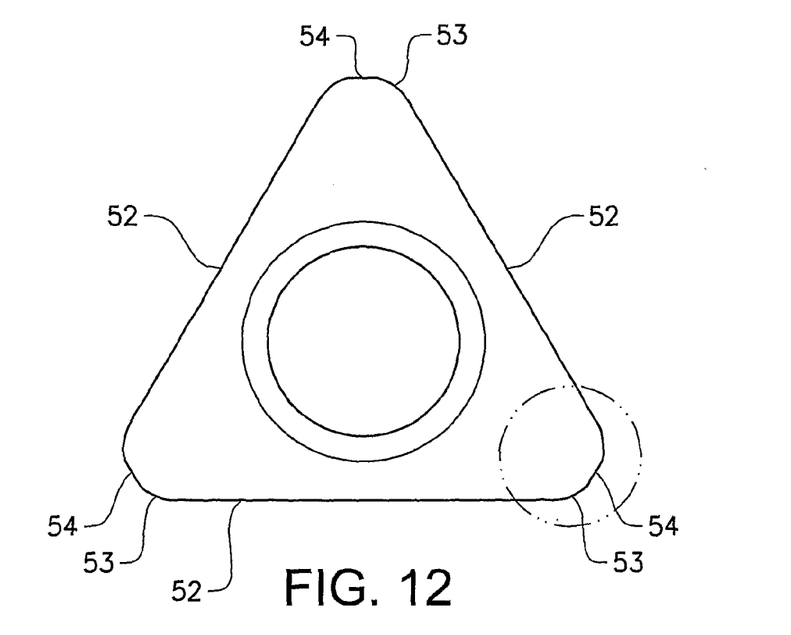
Figure 13:
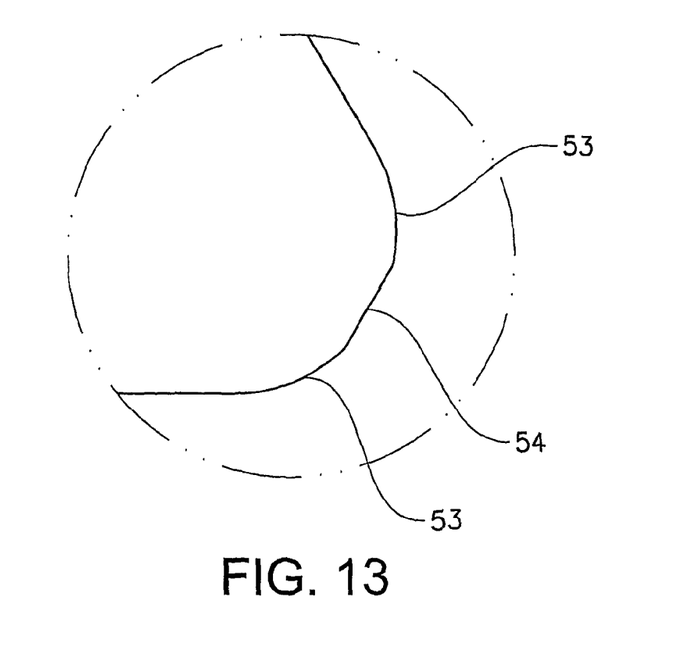

In FIG. 12 a cutting insert 43 before use is shown. The cutting insert has the shape of an equilateral triangle or a square, which sides 52 meet at rounded corners 53. A straight portion 54 is present at the rounded corners 53. FIG. 13 shows a corner 53 of the cutting insert in FIG. 12 in magnified view. The rounded corners have a curvature radius between 0.6 and 1.2 mm and the straight portion has a length between 0.07 and 0.15 mm. Hence, the short straight portion has a curved portion located on both it sides. In use, the cutting insert is secured to said head such that said straight portion is coaxial with a rotational axis of said cutting tool.

The invention claimed is:

1. A holder for a cutting tool, comprising:
a body having a first channel for receiving a stem of the cutting tool and a second channel intersecting with the first channel;
a plunger movably inserted in the second channel, the plunger having a third channel the cross section of which at least partly overlaps with a cross section of the first channel when the plunger is inserted into the body, wherein the stem of the cutting tool when inserted in the first channel may extend into the third channel;
the plunger including a pressure chamber defined by a cavity formed in a wall defining the third channel and a membrane having upper and lower ends sealed to the plunger, and including a supply conduit for supplying a pressure fluid to the annular chamber, wherein when pressure fluid is supplied to the pressure chamber, the membrane expands into the third channel to contact and lock the stem of the cutting tool against movement relative to the body.

2. A holder according to claim 1, wherein the supply conduit comprises a hydraulic oil pipe which connects the pressure chamber with an outwardly facing end wall of the plunger, at which means for pressurizing the pressure chamber is connectable.

3. A holder according to claim 1, wherein the membrane is cylindrical.

4. A holder according to claim 1, wherein the first channel extends along a first length axis and the second channel extends along a second length axis and that the first and second axes are essentially perpendicular to each other.

5. A holder according to claim 1, wherein the third channel extends through the plunger so as to enable the stem of the cutting tool to extend through the third channel when the stem is inserted in the first channel.

6. A holder according to claim 1, wherein the holder further comprises a mechanism for movement of the plunger along a length axis of the second channel so as to position the stem in a lateral position relative to the body.

7. A holder according to claim 1, wherein the holder comprises means for at least one of angular and axial positioning of the cutting tool relative to the body.

8. A holder according to claim 7, wherein the positioning means comprises an indentation provided at an opening of the first channel, which indentation is arranged to receive a notch provided on the stem of the cutting tool, thereby enabling axial and angular positioning of the cutting tool.

9. A holder according to claim 1, wherein the membrane is a cylindrical sleeve which is introduced into an internal cavity in the wall forming the third channel.

10. A holder as claimed in claim 1, wherein the holder can receive a cutting tool that includes a stem and the tool comprises means for angular and/or axial positioning of the cutting tool relative to a body of the holder, wherein the positioning means comprises a notch provided on a stem of the cutting tool, the notch being adapted to be inserted in an indentation of the holder to thereby enable axial and angular positioning of the cutting tool in the holder, wherein the stem of the cutting tool includes a cooling liquid flow entrance in a lower region of the stem, a cooling liquid feeding conduit extending from the liquid flow entrance to a head located on the top of the stem, and a cooling liquid ejector outlet nozzle connected to the cooling liquid feeding conduit at the head, wherein the cooling liquid ejector outlet nozzle has a smaller cross sectional area than the cooling liquid feeding conduit.

11. A holder as claimed in claim 10, wherein the cooling liquid ejector outlet nozzle has a length between 1 mm and 3 mm.

12. A holder as claimed in claim 10, wherein the cooling liquid feeding conduit is eccentric in relation to a center axis of the stem.

* * * * *